Feb. 14, 1961  J. FISHER  2,971,412
MACHINE TOOL CONTROL ELEMENT
Filed Dec. 14, 1956  6 Sheets-Sheet 1

INVENTOR.
JOHN FISHER
BY Hudson, Boughton,
Williams, David & Hoffmann
ATTORNEYS

INVENTOR.
JOHN FISHER

INVENTOR.
JOHN FISHER

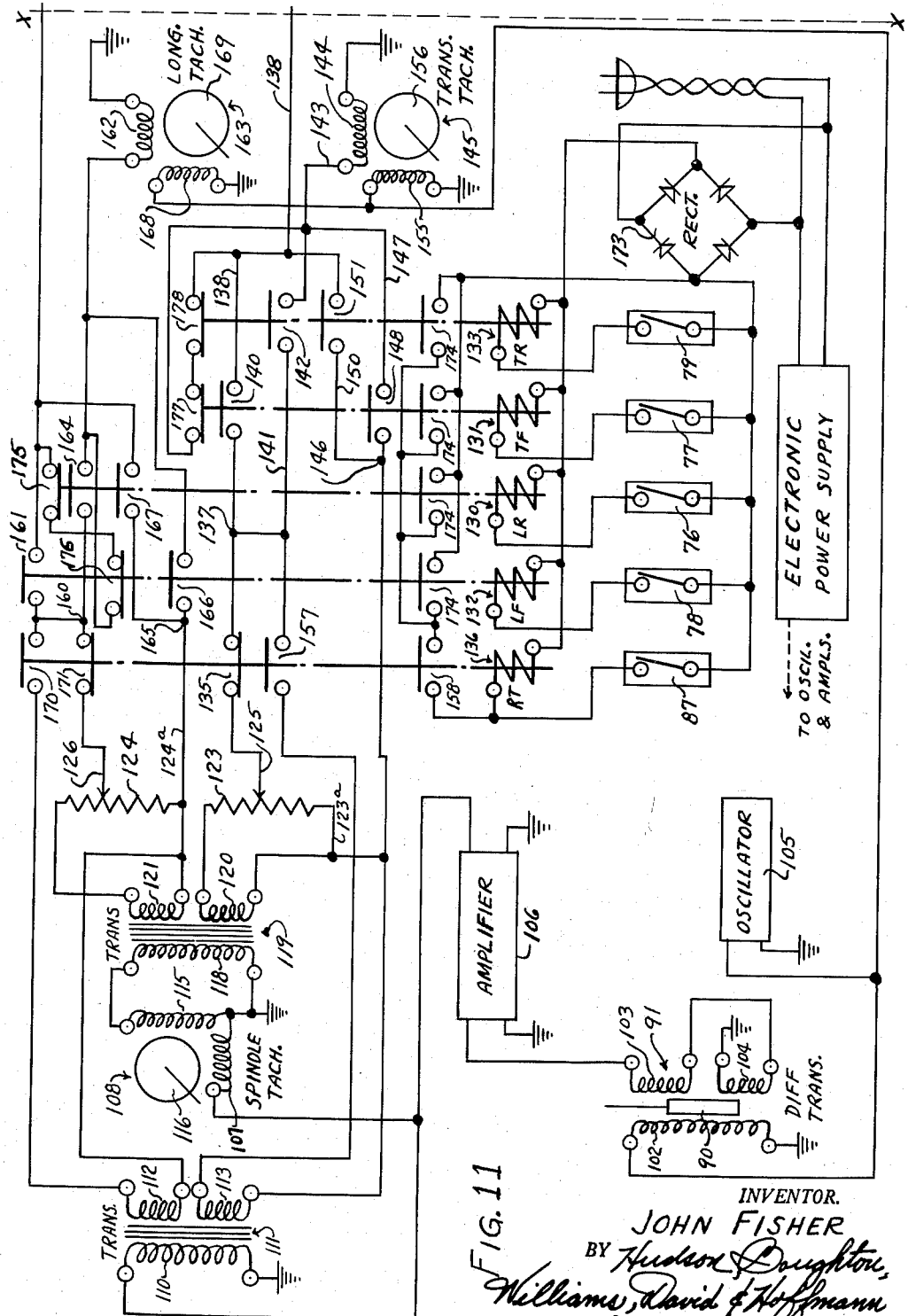

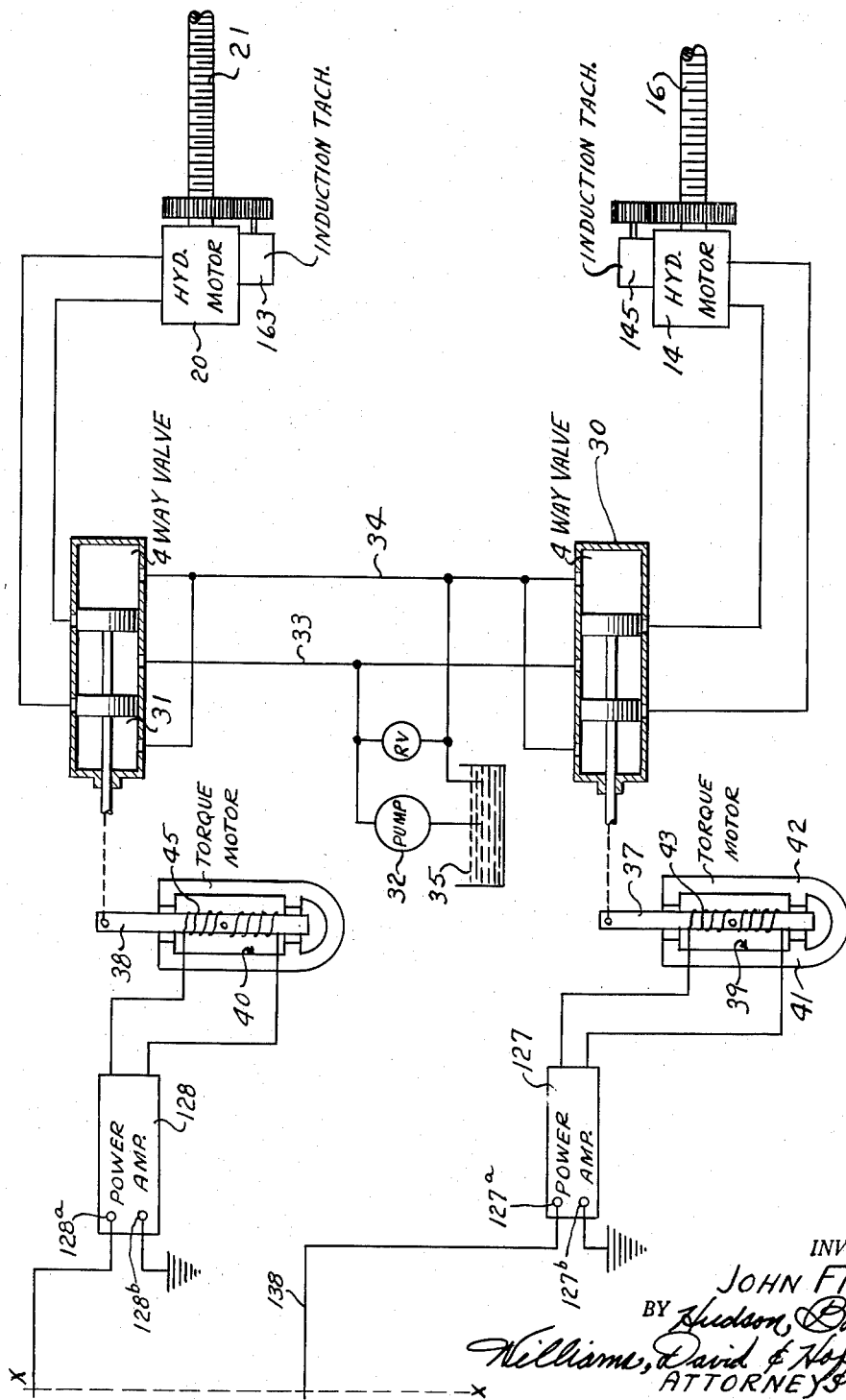

Feb. 14, 1961 J. FISHER 2,971,412
MACHINE TOOL CONTROL ELEMENT
Filed Dec. 14, 1956 6 Sheets-Sheet 6

INVENTOR.
JOHN FISHER
BY
ATTORNEYS

United States Patent Office 2,971,412
Patented Feb. 14, 1961

2,971,412
MACHINE TOOL CONTROL ELEMENT

John Fisher, Cleveland Ohio, assignor to The Warner & Swasey Company, Cleveland, Ohio, a corporation of Ohio Filed Dec. 14, 1956, Ser. No. 628,349

29 Claims. (Cl. 82—2)

The present invention relates to control elements for machine tools and, more particularly, to a control element which is operable in a plurality of directions to control the speed and operation of one or more mechanisms or machine tool elements.

The principal object of the present invention is to provide a new and improved control means, particularly control means operable to cause movement of one or more machine tool elements in a plurality of angularly related directions, wherein the direction of movement of a control member determines the direction of movement of the machine tool element and the magnitude of movement of the control member controls the speed of movement of the element being controlled, and wherein the movement of the control member provides an electric signal which controls the operation of hydraulic means for operating the machine tool element or elements.

Another object of the present invention is to provide a new and improved machine tool in which a single control member is movable in either of two opposite directions from a neutral position to control the forward and reverse movement of a machine tool element along one line of movement and in either of two other opposite directions to control the forward and reverse movements of the machine tool element along a second line of movement angularly related to the first direction and in which the control member can be operated to effect movement of the machine tool element along a line or lines which have the first and second lines of movement as coordinates, the displacement of the control member from the neutral position determining the speed of movement of the element actuated and the element preferably being operated at a rapid traverse rate upon a predetermined displacement from the neutral position.

Still another object of the present invention is to provide a new and improved machine tool in which a machine tool element is actuated by means dependent upon an electrical control signal and at a speed proportional to the magnitude of the control signal and in which the control signal for obtaining feed rate is dependent upon the speed of relative rotation between the workpiece and the tool as well as upon the displacement of a control member, and the signal for the rapid traverse movement of the machine tool element is rendered independent of the relative speed of rotation between the tool and workpiece.

A still further object of the present invention is to provide a new and improved machine tool in which a machine tool element is actuated by means responsive to the magnitude and phase of a control signal and in which the magnitude and phase of the control signal is directly related to the direction and magnitude of movement of a control member from a neutral position, and related to the speed of relative rotation between the workpiece and tool and to the speed of movement of the element, with the signal for obtaining rapid traverse movement of the element being independent of the relative speed of relative rotation of the workpiece and tool.

A further object of the present invention is to provide a control element for a machine tool element or other mechanism in which a control lever is selectively rockable in either of two opposite directions from a neutral position to actuate the element or mechanism with the speed and direction of movement of the element or mechanism being dependent upon the direction and magnitude of displacement of the lever from its neutral position and in which the speed control is obtained by means of a generally dome-shaped cam connected to the lever and cooperating with a spring-biased plunger connected to the movable element of a continuously variable circuit element.

A still further object of the present invention is to provide a new and improved machine tool having a machine tool element to be moved at various feed rates and at a rapid traverse rate and in which a control member is rockable from a neutral position to control the movements of the element, the rocking of the control member in one direction from its neutral position to its maximum displaced position in that direction progressively causing the element to assume its maximum feed rate, to return to zero feed rate, and then to assume its maximum rapid traverse rate.

Another object of the present invention is to provide in a machine tool a new and improved control system for a movable element thereof in which a control member is rockable in one direction from a neutral position to a maximum displaced position to first cause the element to assume a maximum feed rate, to return to zero movement, and then to assume a maximum rapid traverse rate, and in which the control member has a generally dome-shaped cam thereon and a cam follower engages the cam and is operatively connected to a variable circuit element having a movable part for varying a characteristic of the circuit element to control the speed of movement of the movable element with the speed of movement depending on the magnitude of displacement of the movable part from a neutral position corresponding to the neutral position of the control member, the rocking of the lever from its neutral position in one direction to its maximum displaced position causing said variable element to move away from its neutral position in one direction, return to its neutral position, and to move away from its neutral position in the other direction.

The invention further contemplates the provision of a control element of the type set out above in which the general dome-shaped cam connected to the control lever is engaged by a spring biased detent when the lever is rocked through a predetermined angular movement from its neutral position and in which additional movement after engagement of the spring biased detent produces the actuation of an electrical switch for causing the rapid traverse movement of the machine tool element or elements controlled by the control element.

A more specific object of the present invention is to provide a new and improved lathe having a slide which is movable longitudinally of the work upon the actuation of a first motor means and transversely of the work upon actuation of a second motor means and in which a control member is rockable in a first pair of opposite directions from a neutral position to actuate the first motor means to effect movement of the slide longitudinally of the work at a feed rate and in a second pair of opposite directions perpendicularly related to the first pair of directions to actuate the second motor means to effect movement of the slide transversely of the work movement of the slide transversely of the work at a feed rate and in directions intermediate the perpendicularly related directions to effect simultaneous movement of the slide transversely and longitudinally of the work, the rate of movement of the slide being dependent upon the angular displacement of the control member and rapid traverse movements of the slide preferably being obtainable by rocking the control member to predetermined positions.

The present invention resides in certain constructions and combinations and arrangements of parts and further objects and advantages will be apparent from the following detailed description made with reference to the accompanying drawing forming a part of this specification for all matter shown therein, whether or not expressly described, and in which:

Figs. 11 and 12 are a schematic diagram when matched along the lines X—X thereof of a simplified electrical and hydraulic circuit for the movable slides of the machine shown in Fig. 1;

Figure 1:
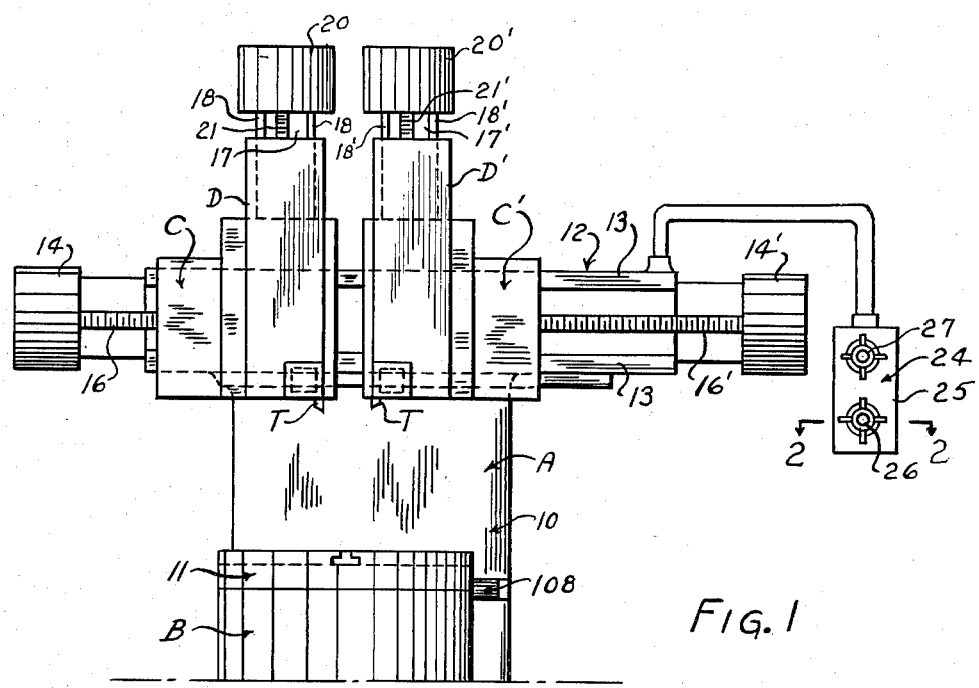
Fig. 1 is a front elevational view of a vertical, turning machine embodying the present invention.
Figure 4:
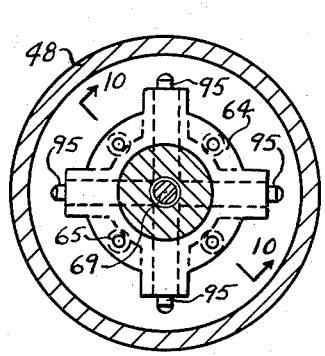
Figs. 4 through 9 are sectional views taken approximately along lines 4—4, 5—5, 6—6, 7—7, 8—8, 9—9, respectively of Fig. 2.
Figure 7:
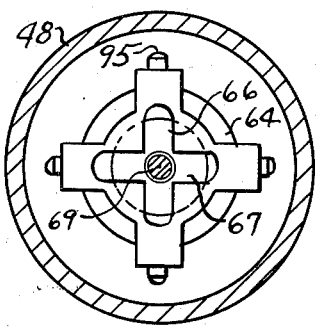
Figure 8:
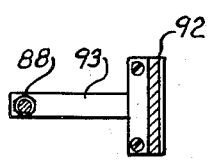
Figure 6:
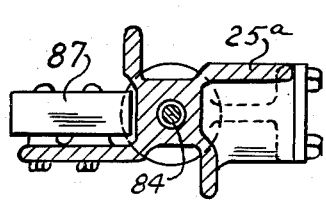
Figure 9:
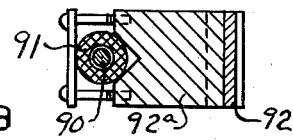

The present invention contemplates the provision of a machine tool having a machine tool element which is movable in either direction along two angularly related lines of movement at either feed or rapid traverse rates and in which the movement of the element is controlled by a control member which is rockable in either of two opposite directions to selectively cause the element to move along one line of movement and in either of two other opposite directions angularly related to the first-mentioned directions to cause the element to move along another line of movement and in either of a third pair of opposite directions angularly related to the other directions of movement to simultaneously cause movement which is the component of movement along both the first-mentioned lines of movement, the feed rate and rapid traverse rate being determined by the displacement of the control member from its neutral position with the rate of movement of the element being continuously variable from zero to a maximum. It is further contemplated that the actuating means for the machine tool element be responsive to a signal which is dependent upon the magnitude of movement of the control member, upon the speed of relative rotation between the workpiece and cutting tool, and upon the relative feed movement between the work and the tool with the rapid traverse movement of the element being obtained by eliminating the dependency upon the relative rotation between the workpiece and tool. To accomplish the operation set forth the present invention further contemplates the provision of a rockable control lever having a cam connected thereto and effective upon certain rocking movements of the control lever to actuate control means to cause movement in the desired direction, control the speed of movement, and to initiate rapid traverse movement.

Referring to the drawings, the present invention is shown as embodied in a vertical turning machine 10 which comprises a vertical bed A and a headstock B located at the lower end of the vertical bed A and including a rotatable work spindle 11 in the form of a horizontal table. The upper end of the vertical bed A includes a transversely extending portion 12 having horizontally extending ways 13 formed thereon. The ways 13 extend transversely of the vertical bed A above the work spindle 11 and support carriages C, C' for horizontal movement transversely of the spindle axis. The carriages C, C' are moved along the ways 13 by hydraulic motors 14, 14' respectively mounted on the outer ends of the portion 12. The hydraulic motors 14, 14' respectively rotate lead screws 16, 16' extending parallel to the ways 13 and threadably engage nuts, not shown, carried by the carriages C, C'. The directions of movement of the carriages C, C' depend upon the directions of rotation of the lead screws 16, 16' respectively, and in turn the directions of rotation of the motors 14, 14'.

The carriages C, C' have vertical extensions 17, 17' and vertical ways 18, 18' formed on the carriages and extensions thereof which support tool slides D, D' respectively, for vertical movement with respect to the bed A and the carriages C, C'. The tool slides D, D' are moved vertically by motors 20, 20' which rotate lead screws 21, 21' which thread into nuts carried by the tool slides D, D'. The motors 20, 20' are mounted at the upper ends of the vertical extensions 17, 17' of the carriages C, C'. The tool slides D, D' are provided with any suitable means at their lower ends to support tools T for operating upon a workpiece supported and rotated by the work spindle 11. It can be seen that tools T are moved longitudinally of the axis of the workpiece by operation of the motors 20, 20' and are moved transversely of the axis of the workpiece by the operation of the hydraulic motors 14, 14'.

The operation of the motors 14, 14', 20, 20' is controlled in the preferred and illustrated embodiment, from a pendant control station 24 suspended from the transversely extending portion 12. The pendant control station 24 includes a housing 25 which supports a control lever 26 for controlling the operation of the motors 14 and 20 for effecting movement of the tool slide D, and a control lever 27 for controlling the motors 14' and 20' for moving the tool slide D'. According to the present invention the control levers 26, 27 may be operated to move the respective tool slides controlled thereby along the axis of the workpiece, transversely of the axis of the workpiece, or at an acute angle to the axis of the workpiece and at a speed dependent upon the displacement of the lever from a neutral position. Preferably, the controls are such that the tool slides D, D' move in the direction of movement of the lever from its neutral position. The constructions and operations of the control lever 27 and the control of the motors 14', 20' is the same as that of the control lever 26 and motors 14, 20, and therefore, only the constructions and operations of the control lever 26 and motors 14, 20 will be described in detail, it being understood that the constructions and mode of operations of control lever 27 and motors 14', 20' are the same.

The motors 14, 20 for moving the tool slide are rotary fluid pressure motors and are respectively connected to a pressure fluid supply and return system by conventional four-way control valves 30, 31 as is shown in Fig. 12. The fluid pressure supply and return system includes a pump 32 connected to a pressure conduit 33 as well as a return conduit 34 connected to a return reservoir or sump 35. The valves 30, 31 each have a movable valve spool which when moved in one direction from a neutral position connects one side of the motor controlled thereby to the pressure conduit 33 and the other side to the return conduit 34 to cause rotation of the motor in one direction, and when moved in the other direction reverses the connections to the motor controlled thereby to cause rotation of the latter in the opposite direction. The magnitude of the displacement of the valve core from its neutral position determines the amount of pressure fluid supplied to the motor controlled thereby and in turn the rate of rotation of the motor. The movable cores of the control valves 30, 31 are respectively connected to armatures 37, 38 of torque motors 39, 40 respectively so as to be actuated thereby. The valves 30, 31 are shown as having an axially slidable valve spool for controlling fluid flow through the valve. It will be appreciated, however, that other suitable valves such as a conventional rotary valve can also be utilized. The torque motors 39, 40 are of conventional construction and the constructions of the two torque motors are alike. The torque motor 39 comprises a pair of opposed magnets 41, 42 positioned on opposite sides of the armature 37 which is pivoted intermediate its ends and between the respective poles of the magnets 41, 42. An electrical coil 43 is wrapped about the armature 37 on opposite sides of its pivot and when the current flows through the coil 43 in one direction the armature rotates in one direction about its pivot and when the current is reversed it rotates in the other direction. The movable valve spool of the control valve 30 is in its neutral position when the armature 37 is in its neutral position and when the armature is moved the valve spool is shifted accordingly to introduce fluid pressure to the motor 14, the displacement and direction of movement of the valve spool depending upon the displacement and direction of movement of the armature. The torque motor 40 is of the same construction as the torque motor 39 and the movements of the armature 38 are controlled by the magnitude and direction of current flowing in coil 45, wrapped about the armature 38.

The directions and magnitudes of the currents flowing in the coils of the torque motors 39, 40 are dependent upon the position of the control lever 26 which may be operated to cause current flow in one of the torque motors 39, 40 or in both of the torque motors 39, 40 and to control the direction and magnitude of current flow so as to control the direction and rate of rotation of the motors 14, 20.

Figure 2:
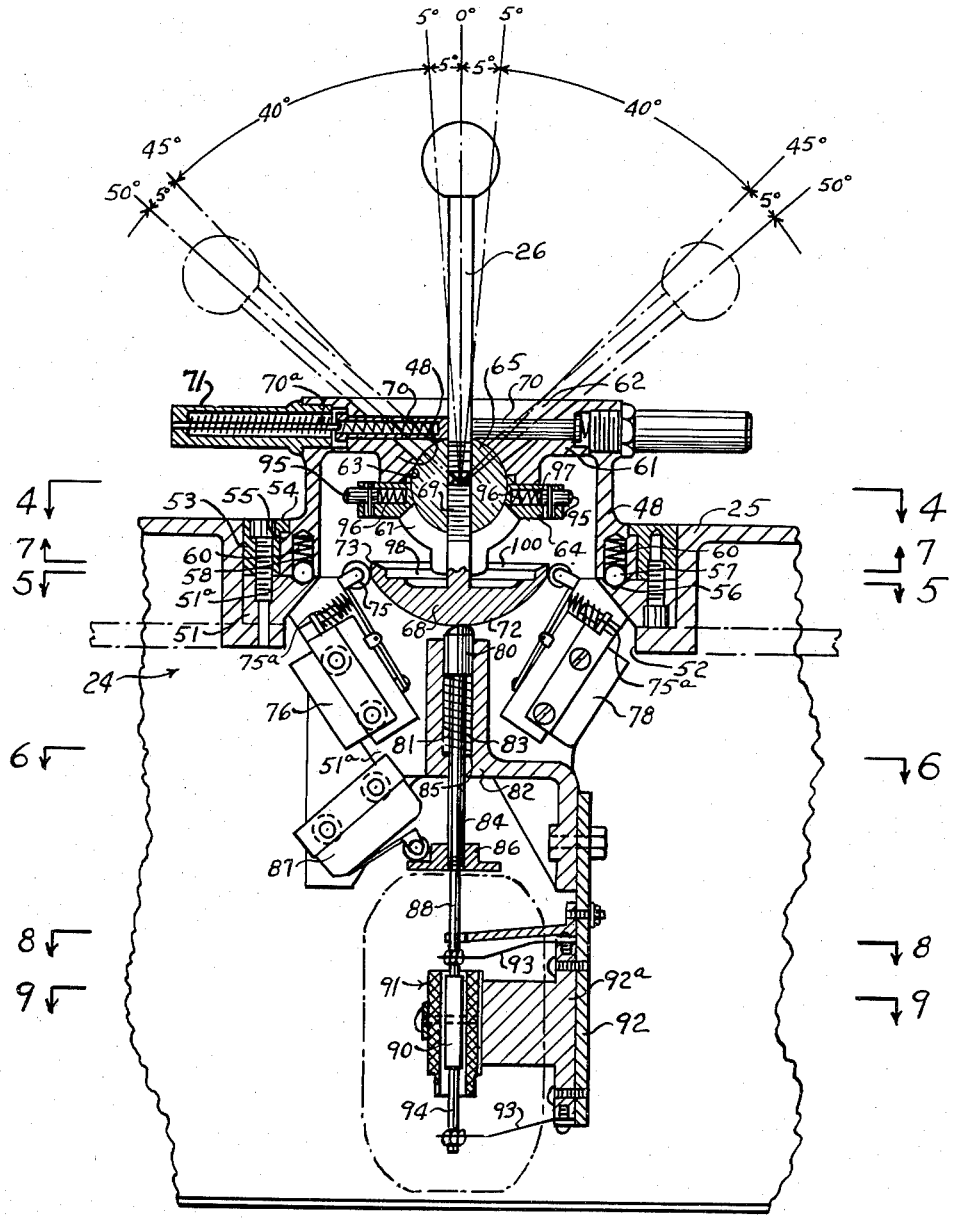
Fig. 2 is a sectional view taken approximately along line 2—2 of Fig. 1 and showing a control element for one of the slides of the turning machine.

As is best shown in Fig. 2, the control lever 26 is rockably supported by a support ring 48 rotatably mounted in the housing 25 of the pendant control station. The inner end of the support ring 48 rides on a bearing surface 51a of an annulus 51 positioned about an opening 52 in the housing 25. A ring 53 has a radial flange portion 54 which overlies an external flange 55 adjacent the inner end of the support ring 48 and maintains the support ring in its proper axial position relative to the annulus 51 but permits the support ring 48 to be rotated relative to the annulus 51. The bearing surface 51a has angularly spaced recesses 56 therein for receiving detent balls 57 positioned in bores 58 in the support ring 48 and opening into the inner end face of the support ring. A biasing spring 60 is positioned in each of the bores 58 and urges the detent balls 57 toward engagement with the bearing surface 51a or into the recesses 56. The recesses 56 are spaced angularly about the bearing surface 51a approximately 45° apart so that the support ring 48 may be positioned and held in angular positions differing by 45°. The detent balls 57 are arranged in pairs with the individual balls of each pair being diametrically opposed to each other.

The outer end of the support ring 48 is closed by a transverse portion 61 having an outwardly-facing, frusto-conically shaped recess 62 therein which extends inwardly of the ring and which, at its inner end, intersects a spherical recess or socket 63 formed in part by the transverse portion 61 and in part by a socket member 64 detachably connected to the transverse portion 61.

The control lever 26 is threaded into a ball 65 which is positioned in the spherical recess 63. The ball 65 and the spherical recess 63 form a ball and socket support for the control lever 26, and the conical recess 62 permits the lever to be rocked through a wide arc.

Figure 10:
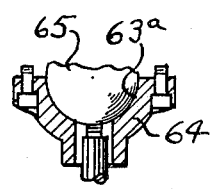
Fig. 10 is a sectional view taken approximately along line 10—10 of Fig. 4.

The socket member 64 has a semispherical recess 63a (see Fig. 10) which forms the bottom portion of the seat for the ball 65 and is detachably connected to the support ring 48 by means of bolts or other suitable fastening means. The socket member 64 also has perpendicularly-related slots 66, 67 therein which form a cross and which intersect the bottom of the semi-spherical recess 63a with their point of intersection being located at the bottom of the recess. The purpose of the slots 66, 67 is explained in detail hereinafter.

In addition to the control lever 26, a switch-actuating cam 68 is carried by the ball 65. The switch-actuating cam 68 is fixed to one end of a rod 69 which extends through the bottom of the socket member 64 and threads into the ball 65 in diametral alignment with the control lever 26. The perpendicularly-related slots 66, 67 limit the rod 69 and, in turn, the lever 26 to rocking movement in two perpendicularly-related planes, the slots 66, 67 each being of sufficient width to receive the rod 69.

The control lever 26 is biased to a neutral position, where it is coaxial with the conical recess 62 and where the rod 69 is located at the intersection of slots 66, 67 by four spring-biased plungers 70 operable in bores opening into the side wall of the conical recess. The plungers engage the control lever 26 and are perpendicular thereto when the latter is in its neutral position and continuously urge the lever to its neutral position. The plungers are spaced 90° from each other and are urged into engagement with the lever 26 by springs 70a positioned within tubes 71. The tubes 71 are mounted in the support ring 48 and extend radially outwardly therefrom in alignment with the bores for the plungers and provide handles for rotating the ring 48 with respect to the frame of the pendant control station.

In the embodiment of Fig. 2 the cam 68 has a convexly or spherically-curved cam surface 72, the chordal plane of which is perpendicular to the rod 69 and which terminates at its periphery in an annular cylindrical surface 73. When the control lever 26 is in its neutral position, wherein it extends coaxially with the conical recess 62 and in which the rod 69 is positioned at the point of intersection of the perpendicularly-related slots 66, 67, the annular surface 73 of the cam is engaged by the switch actuators 75 of switches 76, 77, 78 and 79 spaced about the cam 68. The actuators 75 are biased by individual springs 75a toward engagement with the cam member 68 and when one of the actuators loses engagement therewith the corresponding switch is actuated.

The switches 76–79 are supported by an extension 51a of annulus 51 fastened to the frame 25 of the pendant control station and control the direction of movement of the tool slide D. The switches 76–79 are normally open switches and when the control lever is rocked in one of the directions permitted by the perpendicularly-related slots 66, 67 one of the actuators 75 will ride off the cam 68 to close the corresponding switch contacts to initiate movement of the tool slide D in a given direction. The switches 76–79 are positioned angularly about the cam 68 in the same relative position with respect thereto as the slots 66, 67 of the socket member, and it will be apparent from Fig. 2 that when the control lever 26 is rocked toward one of the switches, that switch will ride off the cam 68 and will be actuated as described. Preferably, the control station and switches are so arranged that the tool slide moves in the direction in which the control lever is rocked.

A cam follower 80 is supported so as to engage the cam surface 72 and engages the cam surface at its central point, or crown, in alignment with the control lever 26, when the control lever 26 is in its central or neutral position. The cam follower 80 is movably supported in and projects outwardly from a bore 81 of a bracket portion 82 of the extension 51a and is urged toward the cam surface 72 by a spring 83 positioned in the bore 81 and engaging the inner end of the cam follower 80. The cam follower 80 is fixed to one end, the inner end, of a rod 84 which is coaxial with the bore 81 and which projects outwardly from the bracket portion 82 through a closed end 85 of the bore 81 opposite the end from which the cam follower 80 projects. The outwardly projecting end of the rod 84 is provided with a flange member 86 which is adapted to operate a switch 87 when the rod 84 is moved to a predetermined position. The outer end of the rod 84 engages a stem 88 extending axially from a core member 90 of a differential transformer 91 supported by a member 92a supported on a plate 92 fixed to part 82 of extension 51a. The core 90 and the stem 88 are in axial alignment with the rod 84, and the stem 88 is biased into engagement with the outer end of the rod 84 by leaf springs 93 one of which is connected between the stem 88 and the member 92a and the other of which is connected between a stem 94 extending from the end of the core 90 opposite to the end from which the stem 88 extends and the member 92a.

It can now be seen that when the control lever 26 is rocked about the center of the ball 65, the cam member 68 will be swung about the same center and since the radius of curvature of the cam surface 72 is less than the distance between the cam surface and the center of the ball 65, the cam follower 80 and, in turn, the rod 84 and the core 90 of the differential transformer 91 will move upwardly, as the switch mechanism is viewed in Fig. 2, toward the support ring 48. If the control lever is swung sufficiently in one direction, the rod 84 will move a sufficient distance for the flange member 86 to actuate the switch 87 which, in the control circuit of the preferred and illustrated embodiment, conditions the control circuit for movement at a rapid traverse rate.

In the embodiment of Fig. 2, the first five degrees of movement of the control lever 26 in one of its directions causes the follower 75 for the switch toward which the lever is moved to ride off the cam surface of the cam member 68 to actuate the particular switch to initiate, or condition, the control circuit for feed movement in a particular direction. Movement of the lever 26 through the next 40 degrees of movement actuates the core of a differential transformer 90, which is described in detail hereinafter, to progressively increase the speed of the tool slide, and after 45° of movement from the neutral position, the cam member 68 will engage one of four spring-biased detents carried by the socket member 64 and which extend radially outwardly therefrom. The spring-biased detents 95 are spaced 90° about the socket member 64 at the remote ends of the slots 66, 67 and comprise members which are operable in respective bores 96 in the socket member 64 and which are urged outwardly by springs 97 positioned within the bores 96. The cam member 68 is provided with an internal annular surface 98 to be engaged by the detents 95, and an inclined surface 100 leading from the surface 98 to the outer periphery of the annular surface 73, as is best shown in Fig. 2. The spring-biased detent 95 first engages the inclined surface 100 and is cammed inwardly thereby to permit engagement with the annular surface 98. The switch 87 is actuated by the flange member 86 after the detent 95 moves into engagement with the surface 98.

Figure 3:
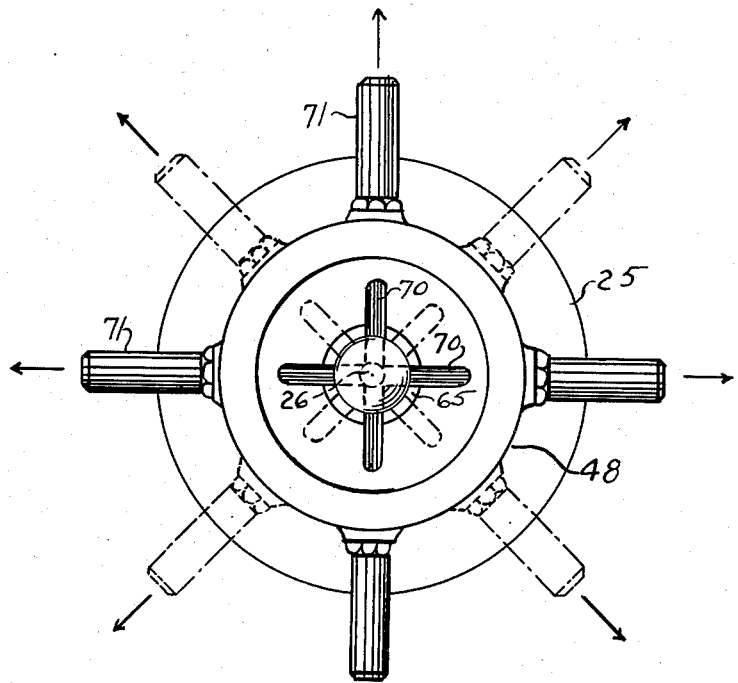
Fig. 3 is a plan view of the control element as shown in Fig. 2.
Figure 5:
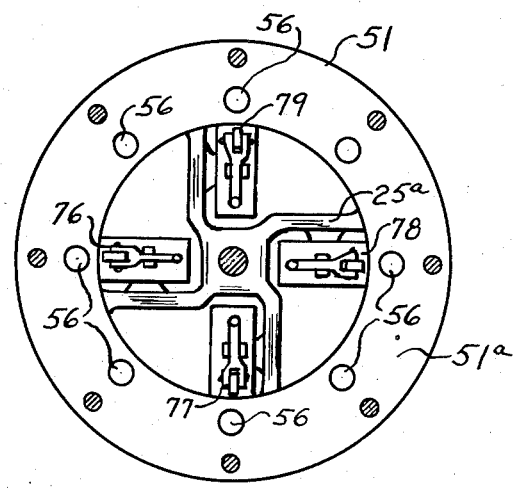

According to the description thus far, when the control lever 26 is rocked in one direction only one of the switches 76–79 is actuated, preferably the switch for operating the tool slide in the direction of movement of the lever. If, however, the support ring 48 is rotated so that the slots 66, 67 permit rocking movement of the lever 26 in directions which are angularly related by 45° to the lines joining the oppositely disposed switches 76–79, the control lever 26 will actuate two adjacent ones of the switches 76–79 when the control lever is rocked from its neutral position. The shifted position of the support ring 48 is shown in dot-dash lines in Fig. 3.

The limit switch 76 controls the longitudinal feed movement of the tool slide D away from the work spindle 11, the switch 78 controls the longitudinal feed movement toward the work spindle 11, the switch 77 controls the transverse feed movement toward the axis of the work spindle, and the switch 79 controls the transverse feed movement away from the axis of the work spindle so that the tool slide D moves in the same direction that the lever is rocked. If the support ring 48 is positioned, as indicated in dot-dash lines in Fig. 3, so that the control lever 26 rocks in directions angularly related to the lines joining the oppositely disposed limit switches, it will be seen that when the control lever is rocked to a position between limit switches 79 and 78, both of these switches will be actuated and, similarly, the limit switches 78, 77 or the switches 77, 76, or the switches 76, 79 may be selectively actuated, and the tool slide will move both longitudinally and transversely of the work spindle to provide a resultant feed at a 45° angle to the work axis and in the same direction as the rocking movement of the lever. If a feed at an angle other than 45° is desired, it may be obtained by setting up the control circuits so that the motor 14 is operated at a different speed than the motor 20 for a given setting of the control lever 26.

Figs. 11 and 12 show a simplified electrical control circuit for use with the above-described mechanism for controlling the operation of the motors 14, 20. In the control circuit of Figs. 11 and 12, the differential transformer 91 is shown as having a primary coil 102 and a split secondary comprised of secondary coils 103, 104. The primary coil 102 is energized by a conventional oscillator 105 and the secondary coils 103, 104 are connected in bucking relationship so that when the movable core 90 is in a central or neutral position, the voltages induced in the secondary coils will effectively cancel each other out and the transformer will have no output signal. As the control lever 26 is rocked from its neutral position, the core 90 will move toward the secondary coil 103 and the voltage induced therein will be of greater magnitude than the voltage induced in the secondary coil 104 with the difference in magnitude depending upon the displacement of the core 90 from its central position, and an output signal will be provided which is directly dependent upon the displacement of the control lever 26 from its neutral position.

The output signal from the differential transformer 91 is amplified by an amplifier 106, the output of which is applied to a field coil 107 of an induction tachometer type device 108 and to a primary coil 110 of a transformer 111 having a split secondary comprised of coils 112, 113. A field coil 107 of the tachometer-type device and the primary coil 110 of the transformer 111 are connected in parallel with each other and the output of the amplifier 106 is connected across the parallel circuit.

The tachometer-type device 108 has an output coil 115 which has a voltage induced therein which is dependent upon the magnitude of the voltage across the field coil 107, and the speed of rotation of a member 116 whose speed is dependent upon the speed of rotation of the work spindle 11. In the preferred embodiment the voltage across the output coil increases with an increase in the speed of spindle rotation. The type of induction tachometer device described is of a conventional construction and, in the illustrated embodiment, is shown as being supported adjacent the work spindle 11 so as to be driven directly thereby.

The ouput of the spindle tachometer device 108 is connected across a primary coil 118 of a transformer 119 having a split secondary comprised of secondary coils 120, 121. The output of the secondary coil 120 of transformer 119 is utilized to control the torque motor 39 for operating the four-way control valve 30 for the motor 14, while the output of secondary coil 121 is utilized to control the operation of the torque motor 40 which actuates the four-way control valve 31 for the motor 20. The secondary coils 120, 121 are respectively connected in series with potentiometer resistances 123, 124, having adjustable connections 125, 126. The potentiometer resistances 123, 124 enable the selection of any fraction of the voltage output of the secondary coils 120, 121 for use with the control lever 26.

A portion of the voltage across each of the potentiometer resistances 123, 124 is applied to the respective one of power amplifiers 127, 128, which control the operation of the torque motors 39, 40. The power amplifiers are of a conventional type which have an output of one polarity for one phase of the input signal and of the opposite polarity for an input signal of the opposite phase. Therefore the directions of movement of the torque motors 39, 40 and, in turn the directions of rotation of the motors 14, 20 are controlled by the phase of the input to the power amplifiers 127, 128. The connections from the potentiometer resistances to the power amplifiers are made through reversing circuits so that the phase of the voltage applied to the power amplifiers 127, 128 may be shifted by 180°. The reversing circuits are controlled by relays 130, 131, 132, 133, the energization of which are respectively controlled by the switches 76, 77, 78 and 79. The relays 130–133 are normally deenergized and the connections to the power amplifiers 127, 128 from potentiometer resistances 123, 124 are normally broken.

The connections between the potentiometer resistance 123 and the power amplifier 127 are basically the same as the connections between the potentiometer resistance 124 and the power amplifier 128. The connections to the power amplifier 127 will be first described. The variable tap 125 of the potentiometer resistance 123 is connected through normally closed contacts 135 of a relay 136 to a junction 137 of the reversing circuit for the power amplifier 127. From the junction 137, the variable tap 125 may be connected to one input terminal 127a of the power amplifier 127 through a connection 138 including normally open contacts 140 of the relay 131 by energizing the relay 131, or the junction 137 may be connected to the input terminal 127b of the power amplifier 127 through a connection 141 including normally open contacts 142 of relay 133. The connection 141 is connected to one side of the contacts 142, while the other side of the contacts 142 is connected to ground and the terminal 127b of the power amplifier through a connection 143 which includes an output coil 144 of an induction tachometer-type device 145. The operation of the tachometer device 145 is explained in detail hereinafter.

The terminal of the power amplifier 127 not connected to the center tap 125 is connected to one end 123a of the potentiometer resistance as follows: One end 123a of the potentiometer resistance 123 is connected to a junction 146 of the reversing circuit for the amplifier 127. The junction 146 is connectable to ground and the terminal 127b through a connection 147 connected between the junction 146 and the connection 143 by closing normally open contacts 148 of relay 131 or the junction 146 is connectable to the terminal 127a through a connection 150 connected to the connection 138 by closing normally open contacts 151 of relay 133.

It can now be seen that when the relay 131 is energized, its normally open contacts 140 are closed connecting the variable tap 125 of the potentiometer resistance 123 to the terminal 127a of the power amplifier 127, and its contacts 148 are closed to connect the end 123a of the potentiometer resistance 123 to the terminal 127b of the power amplifier. If the relay 133 is energized, its normally open contacts 142 are closed to connect the variable tap of the potentiometer resistance 123 to the terminal 127b, and its contacts 151 are closed to connect the end 123a of the potentiometer resistance 123 to the terminal 127a. Therefore, when the relay 133 is energized, a voltage of opposite phase is applied to the power amplifier 127 than when the relay 131 is energized.

The energization of the relays 131, 133, as pointed out hereinbefore, is controlled by the limit switches 77, 79 respectively. It can be seen, therefore, that when the control lever is rocked to close the control switch 77, a signal is applied to the input of the power amplifier 127 which is of one phase, and when it is rocked to close the switch 79, a signal is applied to the input amplifier 127 which is of the opposite phase.

The output of the induction tachometer device 145 functions to oppose the output from the secondary coil 120 when one of the relays 130, 131 is energized. The tachometer device 145 includes a field coil 155 which is energized from the oscillator 105 and the magnitude of the voltage induced in the output coil 144 of the tachometer device is dependent upon the speed of rotation of a member 156 driven by the motor 14 in any suitable manner, such as by gearing, while the phase of the voltage depends upon the direction of rotation of the member 156.

Rapid traverse movements of the tool slide D may be obtained by connecting the output of the secondary coils 112, 113 of transformer 111 to the input of power amplifiers 127, 128 through the reversing circuits for the latter. In the illustrated embodiment the output of the secondary coils 112, 113 is applied to the power amplifiers independently of the spindle tachometer device 108 and the transformer 111 is a step-up transformer to provide the necessary signal. The output of the secondary coil 113 of the transformer 111, in the illustrated embodiment, is connected to the junction 137 of the reversing circuit for the amplifier 127 through normally open contacts 157 of the rapid traverse relay 136, while the other side of the secondary coil 113 is connected directly to the junction 146 of the reversing circuit. Therefore, by energizing the relay 136, the output of the secondary coil 113 is applied to the reversing circuit for the power amplifier 127, and the phase of the output of the secondary coil which is applied to the power amplifier is determined by which of the relays 131, 133 is energized as described above. The rapid traverse relay 136 also includes normally closed contacts 135 in the connection between the variable tap 125 of the potentiometer resistance 123 and the junction 137 which are opened upon energization of the relay to break the circuit from the secondary of transformer 119 to the amplifier 127 and normally open contacts 158 which when closed, complete a holding circuit for the rapid traverse relay.

The reversing circuit between the potentiometer resistance 124 and the input of the power amplifier 128 is the same as the reversing circuit for the power amplifier 127 and will, therefore, not be described in detail. Suffice it to say, that the variable tap 126 of the potentiometer resistance 124 is connected to a junction 160 of the reversing circuit which is connectable to the terminal 128a of the power amplifier by energizing relay 132 to close its normally open contacts 161, or to the terminal 128b of the amplifier through an output coil 162 of a tachometer device 163 by energizing relay 130 to close its normally open contacts 164. The end 124a of the potentiometer resistance 124 is connected to a terminal 165 which is connectable to the terminal 128b by energizing relay 132 to close its normally open contacts 166, and to the terminal 128a by energizing relay 130 to close its normally open contacts 167. Therefore, a voltage of one phase is applied to the power amplifier 128 when the relay 132 is energized and of opposite phase when the relay 130 is energized.

The tachometer device 163 is similar to the tachometer device 145 and has a field coil 168 energized from the oscillator 105. The magnitude of the voltage induced in the output coil 162 depends upon the speed of rotation of a member 169 driven by the motor 20, and the phase of the output voltage differs by 180° for different directions of rotation.

A rapid traverse signal may be applied to the power amplifier 128 by energizing rapid traverse relay 136 when one of the relays 132 or 130 is energized. When the rapid traverse relay 136 is energized, its normally open contacts 170 are closed to complete a circuit from one side of the secondary coil 112 of transformer 111 to the junction 160, and its normally closed contacts 171 in series with the variable tap 126 of potentiometer resistance 124 and the junction 160 are opened to break the output circuit for the secondary coil 121 of transformer 119.

The relays 130–133 and the rapid traverse relay 136 are energized from a rectifier bridge 173 through their respective switches 76–79 and 87. The relays 130–133 each have normally open contacts 174 which are connected in parallel with each other and in series with the holding contacts 158 of rapid traverse relay 136 so that a holding circuit for the rapid traverse relay is completed when the relay is energized together with one of the relays 130–133. This enables the signal applied to the input of the power amplifiers 127, 128 to be rendered independent of the speed of rotation of the work spindle 11. By moving the control lever 26 to a rapid traverse position where it closes the switch 87, the rapid traverse circuit can be utilized, because of the holding circuit completed upon the energization of relay 136, independently of the spindle tachometer device 107 to control the speed of movement of the tool slide until the control lever 26 is returned to a neutral or central position wherein the particular feed switch that had been closed to maintain the holding circuit for the rapid traverse relay is opened to break the holding circuit.

When the control lever 26 is returned to its neutral position, the relay or relays which were energized to complete a circuit or circuits for moving the machine tool element will be deenergized and the circuits to the power amplifiers will be broken to cause the deenergization of any torque motors 39, 40 which had been energized. In order to provide a fast response it is desirable that signals be provided for returning the torque motor armatures to their neutral positions upon movement of the control lever 26 to its neutral position. To this end, the relays 130, 132 for controlling the circuit between the spindle tachometer and the power amplifier 128 for the torque motor 40 are respectively provided with normally closed contacts 175, 176 which are connected in series with each other and which, when closed, complete a connection to connect the output coil of the induction tachometer 163 across the input terminals of the power amplifier 128. Since the output signal of the induction tachometer 163 is connected to the power amplifier so as to tend to move the element in a direction opposite its direction of movement, the signal will drive the torque motor armature toward its neutral position and the strength of the signal will decrease as the speed of the machine tool element decreases to zero.

Relays 131, 133, which are energizable to complete a circuit for controlling the operation of the motor 14 to move the tool spindle D transversely of the work axis, are similarly provided with normally closed contacts 177, 178 respectively. The contacts 177, 178 are connected in series with each other and, when the relays 131, 133 are deenergized, complete a circuit to connect the output coil 144 of the tachometer device 156 across the input terminals of the power amplifier 127 so that the output signal thereof tends to move the armature of torque motor 39 to its neutral position. As the torque motor armature moves toward its neutral position, the speed of motor 14 will decrease causing the signal from the output tachometer to diminish to zero.

In the embodiment described, movement of the control lever 26 from its neutral position to its maximum displaced position causes the machine tool element controlled thereby to progressively assume the maximum feed rate as the control lever 26 is moved through its first 45° of movement and then to assume its rapid traverse rate when moved through the next 5° of movement. When the control lever 26 is moved from the maximum feed position to the rapid traverse position, the feed circuit will be broken by reason of the interlocking contacts 135, 171 when the rapid traverse circuit is made. This will cause a momentary deenergization of the corresponding torque motor and will tend to stop the movement of the element. The rapid traverse circuit, however, will be immediately completed and the output signal from the differential transformer 91 will be at a maximum and the machine tool element will immediately assume movement at its maximum rate. In some applications it is desirable that movement of the control lever 26 in one direction from its neutral position first progressively cause the element to assume its maximum feed rate and to return to zero and then to progressively assume its maximum rapid traverse rate as the lever is moved further in the same direction to its maximum displaced position.

Figure 13:
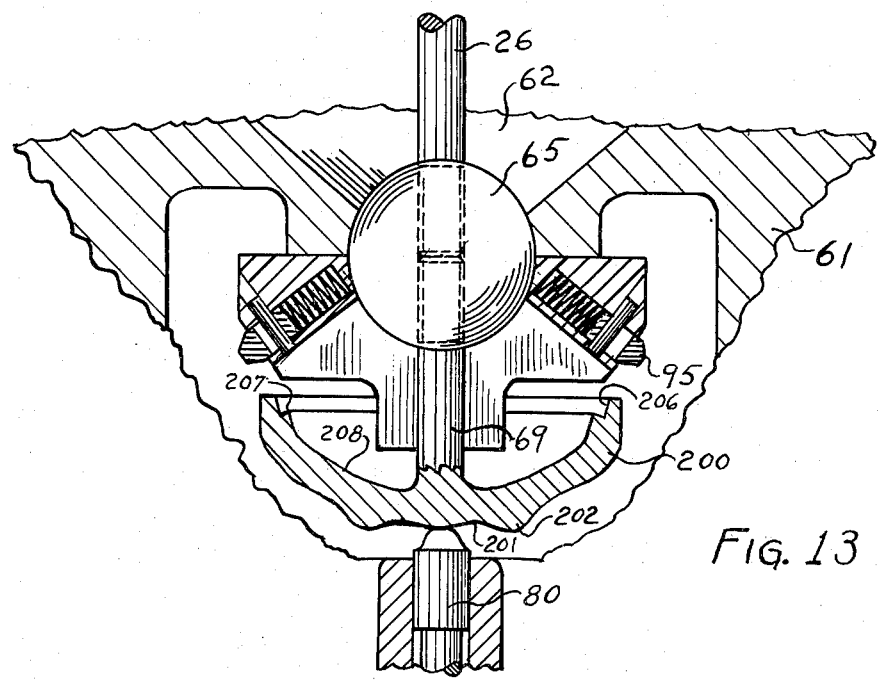
Fig. 13 is a fragmentary detail view corresponding to a portion of Fig. 2 but showing a modified form of the present invention.

In the embodiment of the present invention shown in Fig. 13, rocking of the control lever 26 will cause the machine tool element to first assume its maximum feed rate, to return to zero feed rate, and then to progressively assume its maximum rapid traverse rate. As shown in Fig. 13, the control lever 26 has a generally dome-shaped cam 200 fixed to the lower end thereof as viewed in Fig. 13. The dome-shaped cam 200 is mounted on the control lever 26 for swinging movement in the same manner as the cam 68 of the first described embodiment to operate the switches 76–79 and the cam follower 80. The cam 200, however, differs from the cam 68 in that the cam surface is shaped so that for the first portion of the movement of the lever 26 from its neutral position, the cam follower 80 moves downwardly away from the control lever 26, then returns to its neutral position and moves upwardly toward the control lever 26 as the control lever is moved to its maximum displaced position. The cam 200 has a portion 201 immediately about the center which causes the cam follower to move downwardly upon the swinging of the cam 200 and a circular ridge portion 202 concentric with the center of the cam, the crown of which ridge portion engages the cam follower when the lever has been displaced approximately 17° from its neutral position. Until the crown of the ridge portion 201 is engaged, the cam follower 80 is moving downwardly and when the control lever 26 is displaced more than 17° from its neutral position, the cam follower 80 rides the outer side of the ridge portion and begins to move upwardly toward the control lever 26 and returns to its neutral position after approximately 23° of movement. Continued swinging of the control lever 26 then causes the cam follower 80 to move upwardly with respect to the control lever 26. Upward movement of the cam follower from its neutral position causes the actuation of a rapid traverse switch 205 to energize relay 136 for setting up the rapid traverse circuit.

Figure 14:
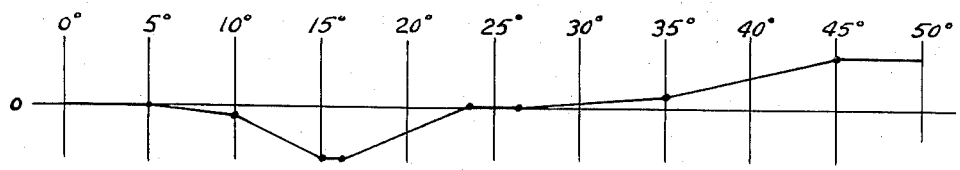
Fig. 14 is a graph showing the movement of the cam follower shown in Fig. 13.

The motion of the cam follower 80 is shown in Fig. 14 where the ordinate represents the displacement of the cam follower relative to its neutral position and the abscissa the degrees of displacement of the lever 26. When the cam 200 has been swung to approximately one third of its maximum displaced position it will be engaged by a detent 95' similar to the detent 95 of the first described embodiment. The detent 95', however, is disposed so that it engages an internal annular surface 206 of the cam 200, which surface terminates in an annular shoulder 207, when the control lever is displaced approximately 17°. The detent will ride over the shoulder upon continued movement of the control lever and onto an internal surface 208 of the cam. The surface 206 holds the cam in maximum feed position and the shoulder 207 enables the operator to feel when the lever is at the maximum rate. The phase of the feed signals and the rapid traverse signal are 180° out of phase at the terminals of the differential transformer. Since, in the circuit shown in Fig. 11, the rapid traverse signal and the feed signal have the same phase or polarity, the connections for one of the signals, preferably the rapid traverse signal, will have to be reversed to use the embodiment of the control lever shown in Fig. 13 in the circuit of Fig. 11. This may be done by merely reversing the connections to the input terminals of the transformer 111.

Figure 15:
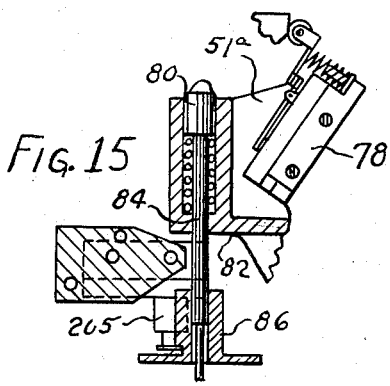
Fig. 15 is a fragmentary sectional view on a reduced scale showing the cam follower of Fig. 13 and the rapid traverse switch operated thereby.

In the embodiment shown in Figs. 13–15 the rapid traverse switch is shown as an over-travel switch 205 which is operated by the collar 86 on the rod 84 connected to the cam follower 80. The rapid traverse switch 205 is actuated whenever the cam follower 80 moves upwardly as viewed in the drawings from its neutral position and when actuated will permit continued movement of the actuating member or collar 86 to permit the displacement of the core 90 a sufficient distance to provide a rapid traverse signal from the transformer 91.

By using the cam 200 the holding contact 174 on the feed relays 130–133 and the holding contacts 158 on the rapid traverse relay may be eliminated since the rapid traverse relay 136 will be energized as soon as the cam follower 80 moves upwardly and will remain energized for movement of the lever 26 through an arc which will cause the machine tool element to move from zero to its maximum rapid traverse rate.

It can be seen from the foregoing that the preferred and illustrated embodiment of the present invention includes a single control lever which may be rocked from a neutral position in four directions lying in a pair of perpendicularly-related planes to selectively operate the tool slide D in any one of four directions depending upon the direction of displacement of the control lever from its neutral position, and that the control lever can be positioned so as to be selectively operated in directions extending angularly to the first-mentioned direction to operate the tool slide at an angle to the first mentioned directions of movement and in a direction of movement depending upon the direction of displacement of the control lever from its neutral position. In addition, the speed at which the tool slide moves is dependent upon the magnitude of the displacement of the lever from its neutral position, and when the control lever is displaced a predetermined angular amount in any of its directions from its neutral position, the tool slide is operated at a rapid traverse rate and the control circuit for the slide is so conditioned that movement of a control lever will vary the rapid traverse rate of movement of the tool slide.

While the preferred embodiments of the present invention have been described in considerable detail, further modifications, constructions and arrangements of parts will occur to those skilled in the art and it is hereby my intention to cover all such modifications and constructions and arrangements that fall within the spirit and scope of the present invention.

Having thus described my invention, I claim:

1. In a machine tool having a rotatable spindle and a machine tool element to be moved relative to the spindle at various rates, a selectively movable control lever for controlling the speed of said element and having a neutral position, means responsive to the movement of said lever to provide an electrical control signal having a characteristic dependent upon the displacement of said lever from said neutral position, control means responsive to said characteristic of an electrical signal for controlling the rate of movement of said machine tool element in accordance therewith, circuit means for applying said electrical control signal to the last-said means to control the movement of said element in accordance with the displacement of said lever and including speed responsive means responsive to the speed of said spindle for varying said characteristic of said control signal independently of movement of said lever and in a manner dependent upon the speed of rotation of the spindle, and further circuit means actuated by a predetermined displacement of said control lever from its neutral position for rendering said control signal independent of said speed responsive means at least for displacements of said lever greater than said predetermined displacements.

2. In a machine tool having a rotatable spindle and a machine tool element to be moved relative to the spindle at various rates to effect relative translatory movement between a tool and workpiece, fluid pressure actuated means for moving said element, first means responsive to a characteristic of an electrical signal for controlling the supply of fluid pressure to said fluid pressure actuated means to control the rate of movement of said element as a function of said characteristic, a movable control lever having a neutral position, means responsive to the movement of said lever from said neutral position to provide a control signal having said characteristic with said characteristic being dependent upon the displacement of said control lever from said neutral position, circuit means for applying said electrical control signal to said first means to control the rate of movement of said element and including speed responsive means responsive to the speed of rotation of said spindle and for varying said characteristic of said control signal independently of said lever and in a manner dependent upon the speed of rotation of said spindle, further circuit means for applying said control signal to said first means independently of said speed responsive means, and means actuatable to render the first-said circuit means ineffective and said further circuit means effective.

3. In a machine tool having a rotatable spindle and a machine tool element to be moved relative to the spindle at various rates, fluid pressure actuated means for moving said element, first means responsive to a characteristic of an electrical signal for controlling the supply of fluid pressure to said fluid pressure actuated means to control the rate of movement of said element, a selectively movable control lever having a neutral position, means responsive to the movement of said lever from said neutral position to provide a control signal having said characteristic with said characteristic being dependent upon the displacement of said control lever from said neutral position, circuit means for applying said electrical control signal to said first means to control the rate of movement of said element and including speed responsive means responsive to the speed of rotation of said spindle for varying said characteristic of said control signal independently of said lever and in a manner dependent upon the speed of rotation of said spindle, further circuit means for applying said control signal to said first means independently of said speed responsive means, and means responsive to a predetermined displacement of said movable control lever from its neutral position to render the first said circuit means ineffective and said further circuit means effective.

4. In a machine tool, a single control lever for selectively controlling the rapid traverse and feed movements of a machine tool element in either of two opposite directions, means supporting said lever for rocking movement in first and second different directions from a neutral position, and a control circuit for said element having a first condition for operating said element at a feed rate and a second condition for operating said element at a rapid traverse rate, said circuit including first means responsive to the displacement of said lever from its neutral position to condition the control circuit to operate said element in a direction dependent upon the direction of displacement of said lever and at a feed rate, means responsive to a predetermined angular displacement of said lever in any of said directions from its neutral position to condition said circuit to operate said element at a rapid traverse rate, and means responsive to the displacement of said lever to vary the rapid traverse and feed rates at which said element is operated in accordance with the displacement of the lever from said neutral position.

5. In a machine tool, a single control lever for selectively controlling the movements of a machine tool element in two opopsite directions, means supporting said lever for rocking movement in first and second different directions from a neutral position, a control circuit for said element including first switch means responsive to the displacement of said lever in said first direction to condition said circuit to operate said element in one of its said directions at a feed rate, second switch means responsive to the displacement of said control lever in said second direction to condition said circuit to operate said element in the other of its said directions at a feed rate, third switch means responsive to a predetermined angular displacement of said lever from its neutral position in any of its said directions to condition said circuit to operate said element at a rapid traverse rate, and a variable circuit element responsive to the movement of said lever to vary the rate of rapid traverse and feed movements of said element in accordance with the displacement of said control lever from its neutral position.

6. In a machine tool, power-actuated means selectively operable to effect movement of an element of the machine tool in different directions, a control lever for controlling the operation of said power-actuated means and having a neutral position, means suporting said control lever for rocking movement from said neutral position, a control circuit for said power-actuated means for selectively operating the latter including a plurality of switch means each actuatable to effect operation of said power-actuated means to move said element in a respective direction, and a speed controller having a movable part actuatable to vary the speed of operation of said power-actuated means, means supporting said plurality of switch means about said control lever, said lever including means for operating respective ones of said switch means when rocked in respective directions from said neutral position, a movable member supported adjacent said lever, means connecting said part to said movable member for actuation thereby, cooperating cam and cam follower elements for moving said movable member, one of said elements being connected to one end of said lever for movement therewith and the other of said elements being connected to said part to effect movement of the latter, said cam and cam follower elements having a predetermined neutral relative position when said lever is in its said neutral position and being moved relative to each other by movement of said lever and said cam element being formed to provide equal throw for corresponding relative displacements between said elements from their said neutral position for relative movement produced by movement of said lever to actuate said switch means.

7. In a machine tool, the structure as defined in claim 6 wherein said cam element has a dome-shaped cam surface formed symmetrically about the point of engagement of said elements when said lever is in its said neutral position, said point of engagement when said lever is in said neutral position being in alignment with said lever.

8. In a machine tool, the structure as defined in claim 7 wherein a support member extending in alignment with the lever connects said cam member to said lever, said cam member being mounted on one end of said support member and the axis of the cam surface thereof coinciding with said support member.

9. In a machine tool, the combination as defined in claim 6 wherein said control circuit includes additional switch means for conditioning said circuit to operate said power-actuated means at a maximum rate of speed and said movable member includes means for actuating said additional switch means upon a predetermined movement thereof from a position corresponding to the neutral position of said control lever.

10. In a machine tool as defined in claim 9 wherein said circuit element has a characteristic the magnitude of which is dependent upon the displacement of said movable part from a neutral position corresponding to the neutral position of said control lever and said cam member has a throw to obtain movement of said follower to displace said movable part first in one direction from the neutral position of the movable part and then in a direction opposite to its said one direction as said control lever is swung in one direction from the neutral position of the lever, said additional switch means being actuated by said follower when said movable part moves in its said other direction.

11. In a machine tool, a machine tool element, first power actuated means for selectively moving said element in first and second opposite directions, a second power actuated means for moving said element in third and fourth opposite directions angularly related to the first-said directions, a control lever, a member supporting said control lever for rocking movement with respect thereto, means on said member limiting said rocking movement to a plurality of directions from a neutral position, said directions being defined by a first set of angularly related planes when said member is in a first position, means supporting said member for rotation whereby said member may be rotated to a second position where said control lever is rockable in a plurality of directions angularly related to the first set of directions, a control circuit for said first and second power actuated means comprising a respective switch means for each of said directions of movement of said element and actuatable to condition said circuit to operate one of said power actuated devices to move said element in the respective one of its said directions, a switch-actuating member connected with said lever and moved from a neutral position upon rocking movement of said lever in a direction dependent on the direction of rocking movement of said lever, and means supporting said respective switch means about said switch-actuating member for the latter to operate one of said respective switch means when the control lever is moved in one of its said first directions of movement to effect operation of one of said power actuated means and to operate a plurality of said respective switch means when the control lever is moved in one of its second-mentioned directions of movement to effect simultaneous operation of both of said power actuated means.

12. In a machine tool, a machine tool element, first power actuated means for selectively moving said element in first and second opposite directions, a second power actuated means for moving said element in third and fourth opposite directions angularly related to the first-said directions, a control lever, a member supporting said control lever for rocking movement with respect thereto, means on said member limiting said rocking movement to a plurality of directions from a neutral position, said directions being defined by a first set of angularly related planes when said member is in a first position, means supporting said member for rotation whereby said member may be rotated to a second position where said control lever is rockable in a plurality of directions angularly related to the first set of directions, a control circuit for said first and second power actuated means comprising a respective switch means for each of said directions of movement of said element and actuatable to condition said circuit to operate one of said power actuated devices to move said element in the respective one of its said directions, a cam member connected with said lever and moved from a neutral position upon rocking movement of said lever in a direction dependent upon the direction of movement of the lever, and means supporting said respective switch means about said cam member for the latter to operate one of said respective switch means when the control lever is moved in one of its said first directions of movement to effect operation of one of said power actuated means and to operate a plurality of said respective switch means when the control lever is moved in one of its second-mentioned directions of movement to effect simultaneous operation of both of said power actuated means, said control circuit including a device having a part movable to vary the speed of operation of said power actuated means, a cam follower cooperating with said cam member and displaced from a neutral position in accordance with the displacement of said control lever from its neutral position, and means connecting said movable part with said cam follower.

13. The combination as defined in claim 12, wherein said cam member has a curved cam surface and is swung about the rocking axis of the lever upon movement of the latter, the radius of curvature of said cam surface differing from the radius of swinging movement of the cam surface.

14. The combination as defined in claim 12, wherein said cam surface is a dome-shaped surface and said cam follower has a zero position in engagement with the center of the cam surface when said lever is in its neutral position, the cam surface being a compound surface having different radii of curvature to provide a throw in one direction for said cam follower and then a throw in the opposite direction to obtain movement of the cam follower through its zero position whereby said cam follower when following said cam as it is swung in one direction from its neutral position moves in a first direction from its neutral position then in the opposite direction through its zero position.

15. In a machine tool, a machine tool element, first power actuated means for selectively moving said element in first and second opposite directions at feed and rapid traverse rates, a second power actuated means for moving said element in third and fourth opposite directions angularly related to the first said directions at feed and rapid traverse rates, a control lever, a member supporting said control lever for rocking movement with respect thereto, means on said member limiting said rocking movement to a plurality of directions from a neutral position, said directions being defined by a first set of angularly related planes when said member is in a first position, means supporting said member for rotation whereby said member may be rotated to a second position where said control lever is rockable in a plurality of directions angularly related to the first set of directions, a control circuit for said first and second power actuated means comprising a respective switch means for each of said directions of movement of said element and actuatable to condition said circuit to operate one of said power actuated devices to move said element in the respective one of its said directions at a feed rate, a cam member connected with said lever and moved from a neutral position upon rocking movement of said lever in a direction dependent on the direction of rocking movement of said lever, and means supporting said respective switch means about said cam member for the latter to operate one of said respective switch means when the control lever is moved in one of its said first directions of movement to effect operation of one of said power actuated means at a feed rate and to operate a plurality of said respective switch means when the control lever is moved in one of its second-mentioned directions of movement to effect simultaneous operation of both of said power actuated means at a feed rate, switch means for conditioning said control circuit to operate said first and second power actuated means at a maximum rapid traverse rate of movement, and actuating means for operating the last-said switch means when said control lever is displaced a predetermined angular amount from its neutral position comprising a cam follower engaging said cam member.

16. The combination as defined in claim 15, wherein said cam surface is a dome-shaped surface and said cam follower has a zero position in engagement with the center of the cam surface when said lever is in its neutral position, the cam surface being a compound surface having different radii of curvature to provide a cam throw to first obtain movement of said cam follower in a first direction to displace the cam follower in one direction from its zero position and then in the opposite direction to obtain movement of the cam follower through its zero position and obtain displacement of the latter in a direction opposite to its said first direction as the lever is swung in one direction from its neutral position.

17. In a machine tool, a machine tool element, first power actuated means for selectively moving said element in first or second opposite directions, a second power actuated means for moving said element in third and fourth opposite directions angularly related to the first-said directions, a control lever, a member supporting said control lever for rocking movement with respect thereto, means on said member limiting said rocking movement to a plurality of directions from a neutral position, said directions being defined by a first set of angularly-related planes when said member is in a first position, means supporting said member for rotation whereby said member may be rotated to a second position where said control lever is rockable in a plurality of directions angularly related to the first set of directions, a control circuit for said power actuated means comprising a respective switch means for each of said directions of movement of said element and actuatable to condition said circuit to operate one of said power actuated devices to move said element in a respective one of its said directions, a cam member connected with said lever and moved from a neutral position upon rocking movement of said lever, and means supporting said respective switch means about said cam member for the latter to operate one of said respective switch means when the control lever is moved in one of its said first directions of movement to effect operation of one of said power actuated means and to operate a plurality of said respective switch means when the control lever is moved in one of its second-mentioned directions of movement to effect simultaneous operation of both of said power actuated means, said control circuit including a device having a part movable to vary the speed of operation of said power actuated means, a cam follower cooperating with said cam member and displaced from a neutral position in accordance with the displacement of said control lever from its neutral position, means connecting said movable part with said cam follower, switch means for conditioning said control circuit to operate said power actuated means at a maximum rate of movement, and actuating means for operating the last-said switch means when said control lever is displaced a predetermined angular amount from its neutral position comprising a member connected to said cam follower.

18. The combination as defined in claim 17, wherein said cam surface is a dome-shaped surface and said cam follower has a zero position in engagement with the center of the cam surface when said lever is in its neutral position, the cam surface being a compound surface having different radii of curvature to provide a cam throw to first obtain movement of said cam follower in a first direction to displace the cam follower in one direction from its zero position and then in the opposite direction to obtain movement of the cam follower through its zero position and to obtain displacement of the latter in a direction opposite to its said first direction as the lever is swung in one direction from its neutral position.

19. In a control mechanism for a machine tool element, a control lever, a support member, means rockably mounting said control lever on said support member for rocking movement relative thereto and limiting the movement of the lever to a plurality of directions from a neutral position with respect to said member, frame means rotatably supporting said member for rotation about the length of said lever with said lever in neutral position whereby the direction of movement of said control lever with respect to the frame means may be changed by rotating said support member, and control means responsive to said rocking movement of said lever relative to said support member to move said element in a direction dependent upon the direction of said rocking movement of said lever with respect to said frame means.

20. In a control mechanism for a machine tool element, a control lever, a support member, means rockably mounting said control lever on said support member and limiting the rocking movement relative to said support member of the lever to a plurality of directions from a neutral position with respect to said member, frame means rotatably supporting said member whereby the direction of movement of said control lever with respect to the frame means may be changed by rotating said support member, and switch means responsive to the rocking movement of said lever relative to said support member when said support member is in a first angular position with respect to said frame means to perform certain control operations affecting the machine tool element and to the rocking movement of said lever in other directions with respect to said frame means when said support member is in another angular position to perform other control operations affecting the machine tool element.

21. In a control mechanism for a machine tool element, a control lever, means mounting said lever for rocking movement from a neutral position comprising a socket member and a ball positioned in the socket member and connected to said lever, said lever lying along an extended diameter of said ball and said socket member having slots therein cooperating with a part connected to said ball to limit the movement of said lever in predetermined directions, frame means supporting said socket member for rotation about the axis of said lever when the latter is in its neutral position to control the direction of movement of said lever with respect to the frame means, and means responsive to movement of said lever when said socket member is in a first angular position to effect movement of the element in a direction dependent upon the direction of movement of the control lever and to the direction of movement of said lever when said socket member is in a second angular position to effect movement of the element in other directions dependent on direction of movement of the control lever.

22. In a control mechanism, a control lever, means mounting said lever for rocking movement from a neutral position comprising a socket member and a ball positioned in the socket member and connected to said lever, said lever lying along an extended diameter of said ball, a support member extending outwardly from said ball in alignment with said control lever and said socket member having intersecting slots therein receiving said support member and limiting the movement of said lever to predetermined directions with respect to said socket member, a cam member connected to said support member, frame means supporting said socket member for rotation about the axis of said lever when the later is in its neutral position to vary the direction of movement of said control lever with respect to the frame means, and means responsive to the direction of movement of said lever with respect to the frame means to perform certain control operations corresponding to the direction of movement of the control lever comprising a plurality of switches supported about said cam member by said frame means.

23. In a machine tool having a rotatable spindle and a machine tool element to be translated relative to each other to effect a relative feed movement between a tool and a workpiece, fluid pressure means for effecting the relative feed movement between said spindle and said element including a valve member movable in different directions from a neutral position to control the direction of relative feed movement with the speed of movement varying from zero in accordance with the displacement of said valve member from its neutral position, electrical means for displacing said valve member from its neutral position in accordance with the magnitude of an electrical signal, and circuit means providing an electrical signal for actuating said electrical means to displace said valve member an amount dependent upon the magnitude of the electrical signal, comprising adjustable means providing a control signal of a predetermined magnitude for each setting of the adjustable means, means applying said control signal to said electrical means, and means independent of said adjustable means and responsive to the speed of spindle rotation to vary the magnitude of said control signal.

24. In an electrical control mechanism, a cam member having a cam surface, an elongated member having a neutral position wherein the elongated member extends along a first axis, said elongated member being mounted for swinging movement relative to said first axis through a pair of preselected angularly related planes, said elongated member supporting said cam member for swinging movement therewith, said cam surface being substantially symmetrical relative to the axis of the elongated member in cross-sections taken in said preselected planes, switches adjacent said cam member each having an actuator engaging the cam surface adjacent its outer periphery, a circuit element including a movable member to vary the electrical characteristics of the circuit element, and cam follower means cooperating with the cam surface and connected with the movable member to move the latter upon swinging movement of said cam member.

25. In a control unit, a selectively movable control lever having a neutral position extending along an axis and supported for rocking movement in different directions relative to said neutral position, switches responsive to the directions of movement of said lever from said neutral position, a movable control part, cooperating cam and cam follower means, one of said means being associated with one end of said lever for movement therewith, the other of said means being connected to said control part, and means biasing said cam and cam follower means into engagement, said cam means having a cam surface substantially symmetrical relative to said axis in cross-sections taken in planes each containing one of said directions of movement and said axis, said part being movable relative to said lever in response to rocking movement of said lever.

26. In a control unit, first control rod means having a neutral position wherein the first rod means extends along a first axis, said first rod means being mounted for rocking movement towards and away from said first axis, a plurality of operating elements spaced angularly about the first axis, said operating elements being operated in response to a rocking movement of the first rod means from said neutral position to effect a first controlling function, second control rod means extending along the first axis for displacement along said first axis, cam means secured to one of said rod means for movement therewith, biasing means biasing said cam means and the other of said rod means into engagement, said cam means being configured such that the second rod means is displaced along said first axis relative to the first rod means in response to predetermined rocking movement of said first rod means relative to the first axis, and control means carried by said second rod means for displacement therewith to effect a second controlling function.

27. In a control unit, first control rod means having a neutral position wherein the first rod means extends along a first axis, mounting means intermediate the ends of the first rod means mounting the first rod means for rocking movement towards and away from the first axis, first biasing means biasing said first rod means towards said neutral position, a plurality of switches spaced angularly about the first axis, a plurality of displaceable switch operating elements spaced angularly about the first axis, each of said operating elements being displaced in response to predetermined rocking movement of the first rod means relative to the first axis to actuate a separate one of said switches, second rod means extending along the first axis for displacement along the first axis, cam means secured to one of said rod means for movement therewith, second biasing means biasing said cam means and the other of said rod means into engagement, guide means confining said first rod means for rocking movement relative to the first axis through a pair of preselected angularly related planes, said cam means having a cam surface which is substantially symmetrical relative to the axis of said one of said rod means in cross sections taken in said preselected planes, said cam surface being configured so that the second rod means is displaced along said first axis toward the first rod means in response to predetermined rocking movement of said first rod means out of the first axis, and control means carried by said second rod means for displacement therewith.

28. A control system for a machine tool having a rotatable spindle, a slide, a drive for effecting relative feed movement between said spindle and slide and including variable speed control means responsive to a variable characteristic of an electrical input signal to effect the relative movement at a rate dependent upon the magnitude of said characteristic, said relative movement effecting relative feed movement between a tool and workpiece, electrical circuit means providing an electrical control signal having said variable characteristic and including adjustable control means selectively actuatable to vary said characteristic of said electrical control signal independently of the setting of said variable speed control means and means responsive to spindle rotation to vary said characteristic of said control signal independently of said adjustable control means and in accordance with spindle rotation whereby said control signal has a selectively variable component and a component dependent on spindle rotation, and circuit means for applying said control signal to said variable speed control means as the input signal thereof.

29. A control system for a machine tool having a rotatable spindle, a slide, a drive for effecting relative feed movement between said spindle and slide and including variable speed control means responsive to a variable characteristic of an electrical input signal to effect the relative movement at a rate dependent upon the magnitude of said characteristic, said relative movement effecting relative feed movement between a tool and workpiece, electrical circuit means providing an electrical control signal having said variable characteristic and including adjustable control means selectively actuatable to vary said characteristic of said electrical control signal independently of the setting of said variable speed control means and means responsive to spindle rotation to vary said characteristic of said control signal independently of said adjustable control means and in accordance with spindle rotation whereby said control signal has a selectively variable component and a component dependent on spindle rotation, and circuit means for applying said control signal to said variable speed control means as the input signal thereof and including additional circuit means for selectively varying the magnitude of said characteristic of said control signal.

References Cited in the file of this patent
UNITED STATES PATENTS

| | | |
|---|---|---|
| 561,777 | Essberger | June 9, 1896 |
| 1,242,516 | Britton | Oct. 9, 1917 |
| 1,668,518 | Shaw | May 1, 1928 |
| 1,961,090 | Smith et al. | May 29, 1934 |
| 2,330,567 | Ehrenberg | Sept. 28, 1943 |
| 2,379,778 | Allen | July 3, 1945 |
| 2,436,582 | Lear | Feb. 24, 1948 |
| 2,437,603 | Hornfeck | Mar. 9, 1948 |
| 2,622,161 | Harter | Dec. 16, 1952 |
| 2,679,678 | Stephan | June 1, 1954 |
| 2,704,360 | Werstein | Mar. 15, 1955 |
| 2,723,598 | Mann | Nov. 15, 1955 |
| 2,796,793 | Addison | June 25, 1957 |
| 2,809,333 | Wagner | Oct. 8, 1957 |

FOREIGN PATENTS

| | | |
|---|---|---|
| 917,682 | France | Sept. 3, 1946 |
| 725,163 | Great Britain | Mar. 2, 1955 |